United States Patent
Lippincott

(10) Patent No.: US 9,642,337 B2
(45) Date of Patent: May 9, 2017

(54) VETERINARY RESTRAINT COLLAR AND IMPROVEMENT

(71) Applicant: Judith Gregory Lippincott, Sacramento, CA (US)

(72) Inventor: Judith Gregory Lippincott, Sacramento, CA (US)

(*) Notice: Subject to any disclaimer, the term of this patent is extended or adjusted under 35 U.S.C. 154(b) by 51 days.

(21) Appl. No.: 14/120,920

(22) Filed: Jul. 7, 2014

(65) Prior Publication Data

US 2015/0053147 A1 Feb. 26, 2015

Related U.S. Application Data

(63) Continuation-in-part of application No. 13/199,639, filed on Sep. 6, 2011, now abandoned.

(51) Int. Cl.
*A01K 13/00* (2006.01)
*A61D 9/00* (2006.01)

(52) U.S. Cl.
CPC ............... *A01K 13/006* (2013.01); *A61D 9/00* (2013.01)

(58) Field of Classification Search
CPC ......... A01K 13/006; A01K 15/04; A61D 9/00
USPC .......... 119/814, 815, 821, 837, 855; 40/300, 40/312, 329, 628
See application file for complete search history.

(56) References Cited

U.S. PATENT DOCUMENTS

| | | | | |
|---|---|---|---|---|
| 4,200,057 A | * | 4/1980 | Agar | A01K 15/04 119/815 |
| 5,454,120 A | * | 10/1995 | Rowlands | A42B 1/248 2/195.1 |
| 5,632,044 A | * | 5/1997 | Sloot | A41D 13/01 2/102 |
| 6,044,802 A | | 4/2000 | Schmid et al. | |
| 6,244,222 B1 | | 6/2001 | Bowen | |
| 6,532,904 B1 | | 3/2003 | Bowen | |
| 6,694,924 B2 | * | 2/2004 | Clark | A01K 13/006 119/174 |
| 6,766,538 B2 | * | 7/2004 | Park | A42B 1/062 2/10 |
| D632,851 S | | 2/2011 | Maroney et al. | |
| D643,160 S | * | 8/2011 | Welles | D30/145 |
| 8,042,494 B2 | * | 10/2011 | Markfield | A01K 13/006 119/815 |
| 2005/0274051 A1 | * | 12/2005 | Benson | G09F 7/04 40/600 |

(Continued)

*Primary Examiner* — Lisa Tsang
(74) *Attorney, Agent, or Firm* — Carr & Ferrell LLP

(57) ABSTRACT

A veterinary restraint collar for an animal, such as a cat or dog, comprising one or more layers of soft and relatively flexible stain resistant material forming a ring to be placed around the neck of the animal. The collar has a drawstring around its inner periphery and radial reinforcing stays for stiffening the collar and also has a post-treatment instructions panel composed of special writing material, such as the non-woven plastic TYVEK (i.e. flashpun high-density polyethylene fibers), for receiving hand-written instructions in permanent or durable ink for the continuing care and recovery of the animal experiencing professional injury, surgery, dental or grooming procedures. The special writing material is different in appearance from the protective material and occupies either a full segment of the collar or a substantial portion of one segment, preferably on the back side with the front side covered by a stain resistant coating or sheet.

7 Claims, 2 Drawing Sheets

(56) References Cited

U.S. PATENT DOCUMENTS

| | | | |
|---|---|---|---|
| 2005/0283103 A1* | 12/2005 | Murfett | A01K 13/006 602/23 |
| 2007/0074677 A1* | 4/2007 | Behme | A01K 13/007 119/850 |
| 2007/0079767 A1 | 4/2007 | Albers | |
| 2009/0107419 A1 | 4/2009 | Davis | |
| 2009/0160651 A1* | 6/2009 | Klein | A01K 11/006 340/572.1 |
| 2009/0178311 A1* | 7/2009 | O'Brien | G09F 3/02 40/299.01 |
| 2012/0325163 A1* | 12/2012 | Markfield | A01K 13/006 119/855 |

* cited by examiner

VETERINARY RESTRAINT COLLAR AND IMPROVEMENT

This application is a continuation-in-part of my co-pending application Ser. No. 13/199,639 that was filed Sep. 6, 2011. The invention disclosed and claimed herein is an improvement in a veterinary restraint collar of the general type disclosed in my prior U.S. Pat. No. 5,133,295, which provided an alternative to the veterinary profession and animal owners to the rigid plastic, cone-shaped Elizabethan collars that had been in common use.

BACKGROUND OF THE INVENTION

My original patent disclosed a collar that was composed of at least one ring of flexible material that is soft enough for the collar to be comfortable for the animal to wear, but having sufficient resilience to stand out from the neck hole of the collar and form a barrier restricting access of the animal's mouth to other parts of its body. That collar received widespread professional and public acceptance and experienced a high degree of commercial success among veterinary professionals and animal owners.

Through the years following the introduction of my original collar, various changes and detailed improvements have been made, both by me and my licensees. One such improvement was the addition of radial stays in the collar to make the flexible material of the collar a firmer barrier to the animal's efforts to reach its body. This also had the effect of dividing the ring of the collar into segments or sections facilitating the folding of the collar into flat form for convenient stacking and storage. Another area of improvement was in the selection of flexible materials, tending toward somewhat more resilience to increase the effectiveness of the collar without sacrificing overall strength, flexibility and comfort.

In addition to my own improvements, others became active in this field. For example, U.S. 2009/0056642 A1, Markfield, discloses a flexible collar that comprises a central padding, for body, between two flexible sheets of material that may be cloth, rubberized cloth, plastic or the like for resistance to staining and for ease of cleaning. Markfield suggests that it is possible to provide advertising or personal messages on the exterior of such collars by known printing processes, although that would be difficult to achieve as ink or other writing or printing substances couldn't penetrate the stain resistant material she specifies, and thus would not provide the much needed professional post-treatment instructions. She also recognizes that collars of this type are provided in a variety of sizes for different animals, and with a variety of means for securing the collar around the animal's neck, including dividing the rings and providing releasable fasteners, or using a drawstring as shown in my original patent. Park, U.S. Pat. No. 6,766,538 B2 discloses a brim or visor for hats that includes a brim cover and a brim insert. The brim cover comprises an upper sheet having an image printed to one side thereof and a lower sheet attached to the upper sheet to form a pocket adapted to receive the brim insert. This visor provides the wearer with the opportunity to display various printed images of their choice, which reflect their personal interests, but doesn't provide the vital means for veterinary professionals to put hand-written post-treatment instructions on the designated panel of the veterinary restraint collar placed on the animal's neck after treatment to provide the continuing care and recovery of animals experiencing injury, surgery, dental or grooming procedures. The utility or use of the visor is decorative and not hand-written. The utility or use of my post-treatment instructions panel is to protect animals in their very vulnerable time of care and recovery from professional veterinary treatment.

The primary purpose of my present invention is to provide an important improvement in veterinary restraint collars that facilitates the care and recovery of the protected animal in a very important way when the animal experiences injury, surgery, dental or grooming procedures.

BRIEF DESCRIPTION OF THE INVENTION

In accordance with the present invention, my improved veterinary restraint collar has a post-treatment instructions panel, different from the protective material of the remainder of the collar, as a special panel of the collar for receiving and displaying the instructions of the treating professionals for the continuing care and recovery of the protected animal experiencing injury, surgery, dental or grooming procedures This panel is composed of special material, such as the non-woven plastic TYVEK (i.e. flashspun high-density polyethylene fibers), that is capable of receiving hand-written instructions in permanent or durable ink, and the remainder of the body of the collar is composed of another suitable material more effective for protecting the animal, such as stain resistant plastic sheeting or cloth, or possibly the rubberized materials. After discharge of the animal with such a collar by the attending veterinary professional, the post-treatment instructions hand-written on the panel remain clearly and durably displayed to assist the animal's owner in caring for the animal throughout the remainder of the recovery period. In its more detailed aspects, the protective collar of my invention comprises a plurality of segments or sections that are joined together or connected along generally radial edges to form a ring, and one of the segments is composed, at least on one side, of the special writing material for receiving the hand-written instructions. A presently preferred feature has one segment of the ring composed of the special writing material on the side opposite the animal's head, forming the panel for display of the instructions, and joins this segment to the other segments at the radial margins of the segment, with a protective covering on the opposite side, such as a stain resistant sheet or coating. Another embodiment of the invention has only a portion of one segment composed of the special writing material, the remainder of the segment being covered by a wide inner binding forming a neck band around the neck hole of the collar.

Other aspects and advantages of the invention will be apparent from the following detailed description, taken in conjunction with the accompanying drawings.

DETAILED DESCRIPTION OF THE DRAWINGS

Figure 1:
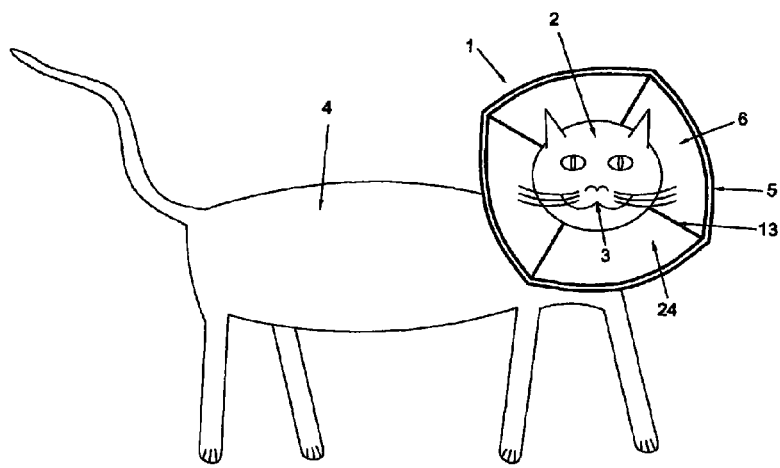
FIG. 1 is a front perspective schematic view illustrating the position of a veterinary restraint collar according to the present invention, comprising a plurality of connected segments forming a ring, around the neck of the animal.
Figure 2:
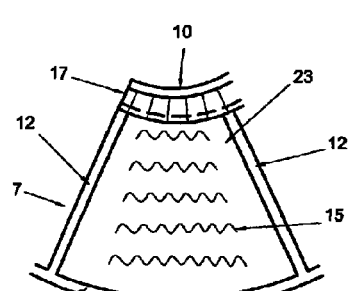
FIG. 2 is a schematic and fragmentary side elevation view of one segment of the invention, the segment comprising a post-treatment instructions panel with a body of hand-written post-treatment instructions represented schematically by a series of lines.

As shown in FIG. 1, the veterinary restraint collar 1 of this invention is around the neck of a cat to restrict access of the cat's mouth 3 and head 2 to the remainder of its body 4, after injury, surgery, dental or grooming treatment. The collar 1 is constructed of a soft, flexible material 24 and reinforced with stays 13 and perimeter binding 5. The stay 13 and perimeter binding 5 are created by sewing 22 binding 20 around folds of material 24. The resultant area between the stays 13 is a segment of the collar 1. FIG. 2 shows a post-treatment instructions panel 7 for insertion in a collar 1 made of two or more layers of material 24. The material 23 for the panel 7 is smooth and capable of being written on with permanent ink 15. The stays 12 are shown and described with FIG. 7. The perimeter 5 is formed by placing all outer edges of the layers of the collar 1 together, with the post-treatment instructions panel 7 being a panel 7 of the top layer, and sewing 22 binding 20 around them. The neck opening 10 is constructed by placing binding 20 around the opening 10, positioning an additional circle of material 24 under the binding 20 and sewing 22 the binding 20 and the top edge of the circle of material 24 to the neck opening 10 of the collar 1. The top edge of the post-treatment instructions panel 7 is then inserted under the bottom edge of the circle of material 24, and the bottom edge of the circle of material 24 is then sewn 22 to the collar 1, creating a passage 17 for receiving an elasticized drawstring 16a, 16b to secure the collar 1 to the animal's head.

Figure 3:
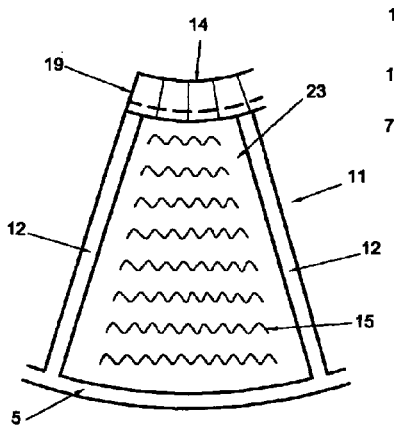
FIG. 3 is a view similar to FIG. 2 showing a different construction of the drawstring passage.

FIG. 3 shows a post-treatment instructions panel 11 for insertion in a collar 1 made of one layer of material 24. The material 23 for the panel 11 is smooth and capable of being written on with permanent ink 15. The stays 12 are shown and described with FIG. 7. The perimeter 5 is formed by sewing 22 binding 20 around the outer edge of the material 23. The neck opening 14 is constructed by sewing 22 binding 20, wide enough to be the receptacle 19 of the elasticized drawstring 16a, 16b, around the inner neck opening 14 of material 23 to secure the collar 1 to the animal's neck.

Figure 4:
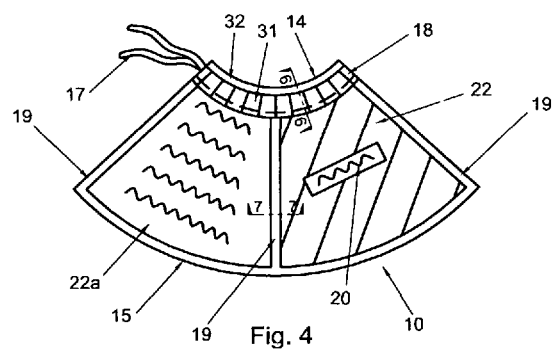
FIG. 4 is a side elevation view of the collar of FIG. 1, lying in a flat, folded condition, constructed of two or more layers of material and having a post-treatment instructions panel, composed of a smooth material, sewn into it.

FIG. 4 illustrates a collar 1 that has two or more layers of material 24, the post-treatment instructions panel 7, which is visible when the collar is around the neck of animal and composed of a smooth material 23 that can be written on with permanent ink 15, being a panel 7 of the top layer, that are sewn 22 together around their outer edges with a binding 20 creating the perimeter binding 5 of the collar 1. Binding 20 is placed around the neck opening 10, a circle of material 24 is inserted under the binding 20, when sewn 22 together results in the top of the passage 17 for accepting an elasticized drawstring 16a, 16b. To complete the passage 17, the top edge of the post-treatment instructions panel 11 is inserted under the bottom edge of the circle of material 24 and both are stitched 22 to the collar 1. The stays 12 are shown and described with FIG. 7, and the stays 13 are shown and described with FIG. 6. A size label 18 is adhered to one segment 6 of the collar 1, other than the post-treatment instructions panel 7.

Figure 5:
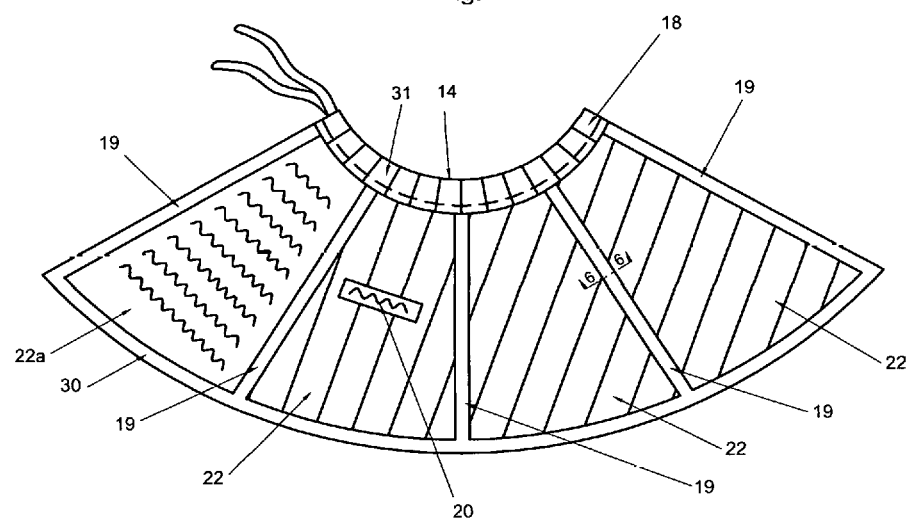
FIG. 5 is a side elevation view of the collar of FIG. 1, lying in a flat, folded condition, constructed of one layer of material and having a post-treatment instructions panel sewn into it.

FIG. 5 illustrates a collar 1 that has one layer of material 24, the post-treatment instructions panel 11, which is visible when the collar is around the neck of an animal and is one segment 11 of that layer that is composed of a smooth material 23, capable of being written on with permanent ink 15, which has a binding 20 sewn 22 around its outer edge creating the perimeter binding 5 of the collar 1. Binding 20 wide enough to be the receptacle 19 for the elasticized drawstring 16a, 16b is sewn 22 around the neck opening 14, which results in the passage 19 for accepting an elasticized drawstring 16a, 16b. The stays 12 are shown and described with FIG. 7, and the stays 13 are shown and described with FIG. 6. A size label 18 is adhered to one segment 6 of the collar 1, other than the post-treatment instructions panel 11.

Figure 6:
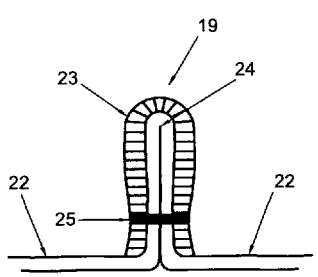
FIG. 6 is an enlarged fragmentary section view taken substantially along line 6-6 of FIG. 4.

As shown in FIG. 6, the construction of a stay 13 that isn't adjacent to a post-treatment instructions panel 7, 11 is achieved by stitching 22 a binding 20 around a fold of material 24. FIG. 6 is referenced on FIG. 4 on a stay 13 of a segment of the collar 1 other than the post-treatment instructions panel 6.

Figure 7:
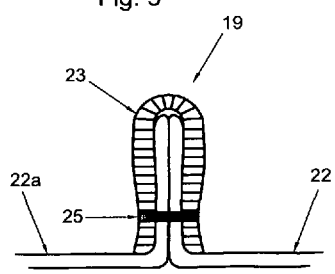
FIG. 7 is an enlarged fragmentary section view taken substantially along line 7-7 of FIG. 4.

FIG. 7 details the construction of a stay 12 that is adjacent to a post-treatment instructions panel 7, 11. The edge of the post-treatment instructions panel material 23 is aligned with the edge of the material 24; the binding is wrapped around them; and, the binding is stitched 22 through both materials 23, 24. FIG. 7 is referenced on FIG. 4 on a stay 12 of a panel of the collar 1 that is a post-treatment instructions panel 7.

Figure 8:
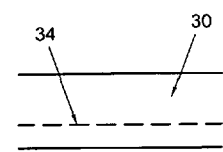
FIG. 8 is an enlarged fragmentary view of the binding material and stitching that attaches the binding to the collar of FIG. 1 to form the stays, the perimeter binding, and the neck opening of the collar of FIG. 1.

FIG. 8 is an enlarged fragmentary view of a piece of binding 20 that has stitching 22 applied to it. Binding 20 is used to construct the neck openings 10, 14, stays 12, 13 and outward perimeter 5 of the collar 1.

Figure 9:
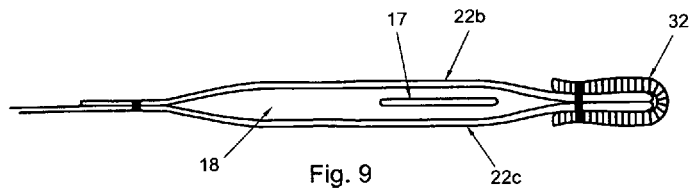
FIG. 9 is a greatly enlarged fragmentary section view taken substantially along line 9-9 of FIG. 4; and, FIG. 10 is a back perspective view of the collar having two or more layers of material, opened and viewed from above and shown on an enlarged scale.

FIG. 9 is a greatly enlarged fragmentary section view of the neck opening 10 of the collar 1 of FIG. 4 that has two or more layers of material 24. It details the stitching 22 of the binding at the top of the neck opening 10 and the stitching 22 of the drawstring passage 17. FIG. 9 is referenced on FIG. 4 by the number 9 at the neck opening 10.

Figure 10:
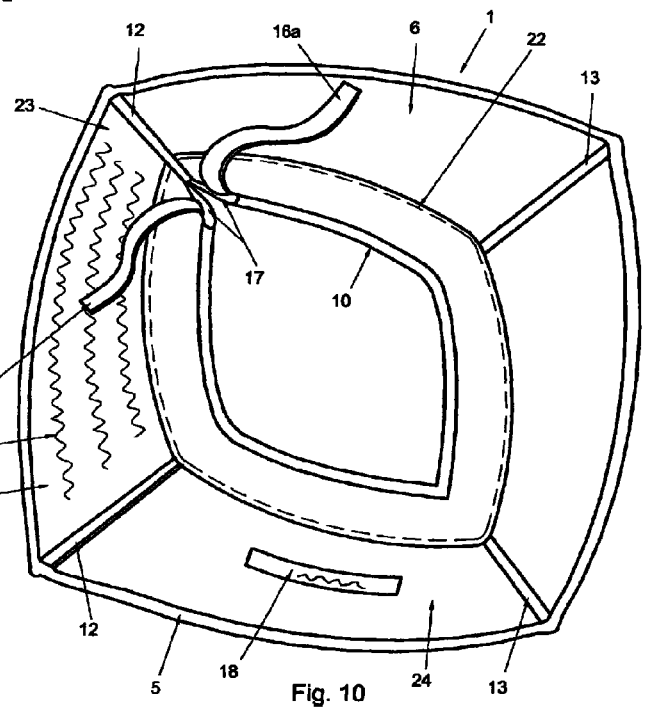

FIG. 10 illustrates a back perspective view of the collar 1, having two or more layers of material 24, and the collar 1 is open and viewed from above. The post-treatment instructions panel 7, visible when the collar is around the neck of an animal and composed of a smooth material 23 that can be written on with permanent ink 15, is a panel 7 placed on the top layer of material 24, and both are sewn 22 around the outer edge of the collar 1, with a binding 20, creating the perimeter binding 5 on the collar 1. Binding 20 is placed around the neck opening 10, a circle of material 24 is inserted under the binding 20 which, when sewn 22 together results in the top of the drawstring passage 17 for accepting an elasticized drawstring 16a, 16b. To complete the drawstring passage 17, the bottom edge of the circle of material 24 is sewn 22 to the collar 1. A size label 18 is adhered to a segment 6 of the collar 1, other than the post-treatment instructions panel 7. The stays 12 are shown and described with FIG. 7. The stays 13 are shown and described with FIG. 6.

The invention claim is:

1. A veterinary restraint collar for use around the neck of an animal having a head, neck and body, to restrict access of the animal's mouth to its body, comprising:
   a plurality of segments of flexible material, generally cone-shaped and having wide and curved outer margins forming an outer periphery of the collar, generally radial side margins, and narrow, curved inner margins, and generally radial stays securing the radial side margins of the segments in side-by-side relation to form a ring around the animal's neck;
   means for securing the collar releasably around the animal's neck;
      only one of the segments being a writing material and the only one of the segments being a single layer, the writing material forming a panel capable of receiving hand-written post-treatment instructions in durable ink for continuing care and recovery of the animal, and a remainder of the segments being rubberized, stain-resistant protective material, the remainder of the segments being made of different material from the writing material;
      wherein the hand-written, post-treatment instructions on the panel will be permanently and durably displayed on the collar;
      wherein the writing material further comprises flash high-density polyethylene fibers, and is white for forming the post-treatment instructions panel.

2. A veterinary restraint collar as defined in claim 1, wherein a front side of the collar is to be positioned beside the animal's head and a back side of the collar is to be positioned beside the animal's body, and the writing material being exposed on the back side of the collar; and wherein at least one side of the only one of the segments is capable of receiving the hand-written, post-treatment instructions.

3. A veterinary restraint collar as defined in claim 1, further comprising a binding around the inner margins of the segments forming a neck hole for the collar, the binding also defining a passage for a drawstring comprising the means for securing the segments around the animal's neck.

4. A veterinary restraint collar as defined in claim 3, wherein the segments have a pre-selected radial width, and the binding has a radial width that is between about one-quarter and one-half of the preselected radial width so as to form a neck band covering a substantial, radial inner portion of each of the segments, the neck band comprising the protective material and the panel comprising only the radial, outer portion of the only one of the segments.

5. A veterinary recovery collar for the health and well-being of an animal, the veterinary recovery collar comprising:
   a plurality of segments joined together along radial edges with reinforcing stays to form a ring;
   wherein the ring further comprises an inner periphery and an outer periphery;
      the inner periphery forming a neck hole of the veterinary recovery collar;
      the outer periphery spaced radially outwardly from the neck hole of the veterinary recovery collar;
   wherein only one segment of the plurality of segments is a post-treatment instructions panel, the post-treatment instructions panel comprising writing material for displaying hand-writing instructions in durable ink for continuing care and recovery of the animal, the post-treatment instructions panels being a single layer and being of a different material than a remainder of the plurality of segments, the remainder of the plurality of segments being made of a protective material, the protective material being flexible, rubberized, and stain resistant, wherein the post-treatment instructions panel is non-woven flashspun high-density polyethylene fibers, the writing material being a different color than the protective material;
      wherein the post-treatment instructions panel further comprises a passage for receiving an elasticized drawstring;
   wherein one segment of the plurality of segments comprises a label segment, the label segment being a different segment than the only one segment of the plurality of segments comprising the post-treatment instructions panel, the label segment including a size label for the veterinary recovery collar; and
   further comprising means for securing the ring releasably around the neck of the animal neck, the means for securing the ring releasably around a neck of the animal neck being the elasticized drawstring for tightening the neck hole of the veterinary recovery collar.

6. A veterinary recovery collar of claim 5, wherein the reinforcing stays along the radial edges facilitates the recovery collar folding flat for storage.

7. The veterinary recovery collar of claim 5, wherein the reinforcing stays along the radial edges are formed by a binding around a fold of material, the binding around the fold of material formed by stitching.

* * * * *